United States Patent [19]
Carmichael et al.

[11] Patent Number: 5,303,034
[45] Date of Patent: Apr. 12, 1994

[54] ROBOTICS TARGETING SYSTEM

[75] Inventors: Larry K. Carmichael, Westminster; Frank A. Goodknight, Boulder; Michael E. Moy, Lafayette; Robert W. Schmidt, Broomfield, all of Colo.

[73] Assignee: Storage Technology Corporation, Louisville, Colo.

[21] Appl. No.: 877,668

[22] Filed: May 1, 1992

[51] Int. Cl.$^5$ .................. G01B 11/14; G06K 7/015; B65G 1/06; B25J 19/02
[52] U.S. Cl. .................. 356/375; 356/399; 356/401; 250/548; 250/555; 250/559; 250/561; 414/273; 414/274; 901/47
[58] Field of Search .............. 356/375, 401, 399; 901/47; 414/273, 274; 250/548, 555, 559, 561; 358/108, 101

[56] References Cited

U.S. PATENT DOCUMENTS

| | | | |
|---|---|---|---|
| 4,348,152 | 9/1982 | Takamatsu | 194/906 |
| 4,908,777 | 3/1990 | Wolfe | 364/182 |
| 4,958,160 | 9/1990 | Ito et al. | 356/401 |
| 4,967,370 | 10/1990 | Stern et al. | 395/89 |
| 4,971,444 | 11/1990 | Kato | 356/375 |
| 4,979,135 | 12/1990 | Moy | 901/47 |
| 5,028,797 | 7/1991 | Abe et al. | 356/401 |
| 5,083,073 | 1/1992 | Kato | 395/89 |
| 5,181,823 | 1/1993 | Hussey et al. | 250/561 |

Primary Examiner—James C. Housel
Assistant Examiner—Rachel Freed
Attorney, Agent, or Firm—Duft, Graziano & Forest

[57] ABSTRACT

A robotic arm calibration system is described which comprises a video line scan camera vision system used in conjunction with a plurality of novel "N"-shaped targets in an automated tape storage library. The targeting system of the present invention provides, with a single horizontal video scan of the target, all of the data necessary to enable calculation of a reference point of the robotic arm with respect to each target to thereby obtain precise robotic arm calibration in relationship to the library system workspace. The position of the robotic arm is determined using the vision system in conjunction with calibration targets which are located within the tape cartridge library, in addition to a target located on the robotic arm. The present system functions independently of the spacing between the arm retrieval mechanism and the tape cartridge storage cells.

12 Claims, 7 Drawing Sheets

ROBOTICS TARGETING SYSTEM

FIELD OF THE INVENTION

This invention relates generally to robotic arm calibration and, in particular, to a system for calibrating a robotic arm using a novel calibration target with a line scan camera in an automated robotic library system.

PROBLEM

It is a problem in robotic arm systems to provide an accurate determination of the position of the robotic arm in relation to the workspace. Positional accuracy of the robotic arm and any devices attached thereto affects both the repeatability of an operation as well as the ability of the robotic arm to accurately perform the particular task required of it. There are many different arm calibration arrangements known in the art and all entail the use of some sort of sensor to determine the position of the robotic arm. A common method of calibrating the position of the robotic arm gripper mechanism is to use a vision system to orient the robotic arm with respect to one or more baseline targets located in the work space. These conventional arm calibration arrangements have typically employed video cameras which provide a pixel array output. This pixel array requires processor-intensive image processing in order to determine the specific location of the scanned image relative to the robotic arm and camera. The image processing is time-consuming because of the large number of pixels in the array which have to be processed before these relative image locations can be determined. In addition, this type of video camera is relatively expensive in comparison to a video line scan camera.

If a line scan camera is used, however, a problem exists in positioning the robotics arm in two dimensions to a known target on a wall using a camera that produces only a one dimensional "slice" through its image. For example, the horizontal positioning of the arm relative to the target is relatively easy to determine as long as the target is found within the field of vision of the line scan camera. The vertical positioning of the robotic arm with respect to the target is much more difficult to determine however. This is because the line scan camera does not "view" in the vertical axis. The use of a line scan camera in conjunction with a conventional target requires an excessive amount of robotics positioning in order to find the exact vertical center of the target since the camera cannot view the entire target at a given time.

SOLUTION

These problems are solved and a technical advance achieved in the field by the robotic arm calibration system of the present invention. This calibration system comprises a video line scan camera vision system used in conjunction with a plurality of novel "N"-shaped targets.

The calibration system of the present invention provides, with a single horizontal video scan of the target, all of the data necessary to enable calculation of a reference point of the robotic arm with respect to each target to thereby precisely calibrate the robotic arm in relation to the workspace.

One example of the workspace within which the robotic arm operates is an automated tape cartridge library system. A typical automated library system contains an array of cells for storing tape cartridges. A robotic arm is pivotally rotatable about the center of the array and contains a tape cartridge retrieval mechanism attached to one end of the arm. The position of the robotic arm is determined using the vision system in conjunction with calibration targets which are located within the tape cartridge library, in addition to a target located on the robotic arm.

An important feature of the present calibration system is that the system functions independent of the spacing between the cartridge retrieval mechanism and the tape cartridge storage cells.

A number of additional advantages ensue from using a line scan camera in combination with the target of the present invention. First, a line scan camera is smaller and lighter than a pixel array type camera. This makes accurate positioning of a given robotic arm faster due to the relatively lower mass of the attached camera. In addition, a line scan camera is more reliable than an pixel array type camera because of the relatively fewer components. In addition to being less expensive than a pixel array camera, a typical line scan camera has a greater resolution, for example, 2048 pixels Versus 512 pixels per line for a typical pixel array camera. While providing greater resolution in a given scan than a pixel array camera, a line scan camera, when used with the "N"-shaped target of the present invention, requires significantly less image processing time in comparison to a pixel array camera because there are significantly fewer pixels to be processed to find the target center.

The present system provides a method for calibrating the robotic arm and attached gripper mechanism to provide fine positioning of the robotic arm gripper mechanism while requiring less image processing time and providing greater image resolution in comparison to conventional robotic systems. Because of the reduced image processing time, the robotic arm can scan cartridge storage cells at an optimum velocity without having to slow down or stop to wait for image processing of each target.

DETAILED DESCRIPTION

Figure 1:
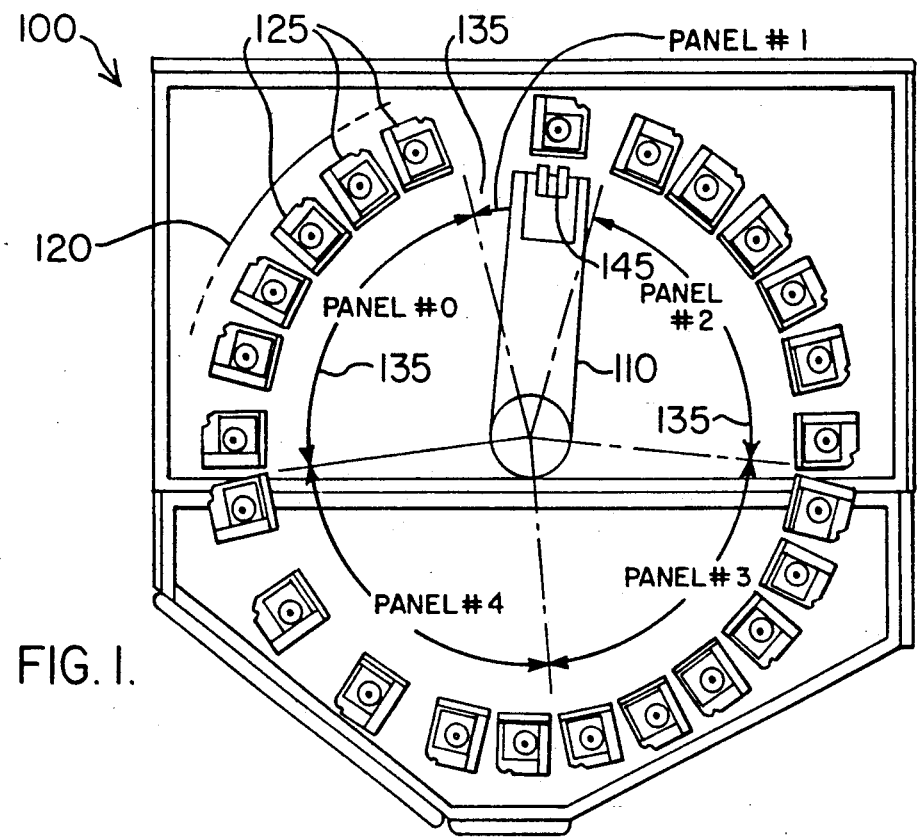
FIG. 1 illustrates a top view of the overall environment of a typical automated robotic tape library system.
Figure 2:
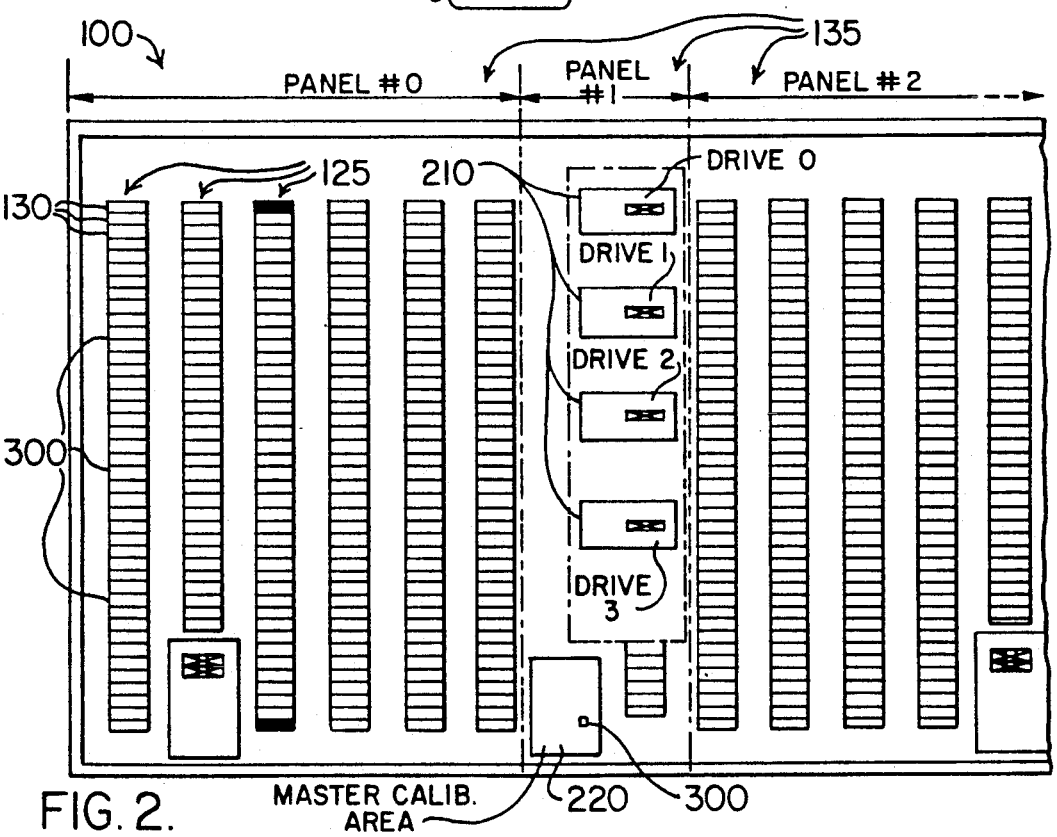
FIG. 2 illustrates a side view of a segment of the library system.

FIG. 1 illustrates a top view of the overall architecture of a typical automated robotic tape library system 100 wherein the calibration system of the present invention is employed. FIG. 2 illustrates a side view of a segment of the library system 100. A typical automated library system operates to store and retrieve a large number of magnetic tape cartridges of the 3480-type format for an associated host processor. An example of such an automated magnetic tape cartridge handling system 100 is the 4400 Automated Cartridge System (ACS) manufactured by Storage Technology Corporation of Louisville, Colo.. titled "Robotic Arm Calibration System" and filed on Jan. 27, 1988, and issued on Mar. 13, 1990 are hereby incorporated by reference in the present application to the same extent as fully set forth herein.

Library system 100 includes an array 120 of circularly arranged cells 130 for storing magnetic tape cartridges. A robotic arm 110 is pivotally rotatable about the center of the array 120 and contains a tape cartridge retrieval mechanism 145. This tape cartridge retrieval mechanism 145 is located in a position for retrieving and replacing tape cartridges in the tape cartridge storage cells 130. The retrieved tape cartridges are loaded into a tape transport mechanism (tape drive) 210 in response to a read/write request from a host computer (not shown) which is connected to the library system 100. Tape cartridge storage cells 130 and tape drives 210 are arranged in columns 125 which are grouped in "panels" 135.

Figure 4:
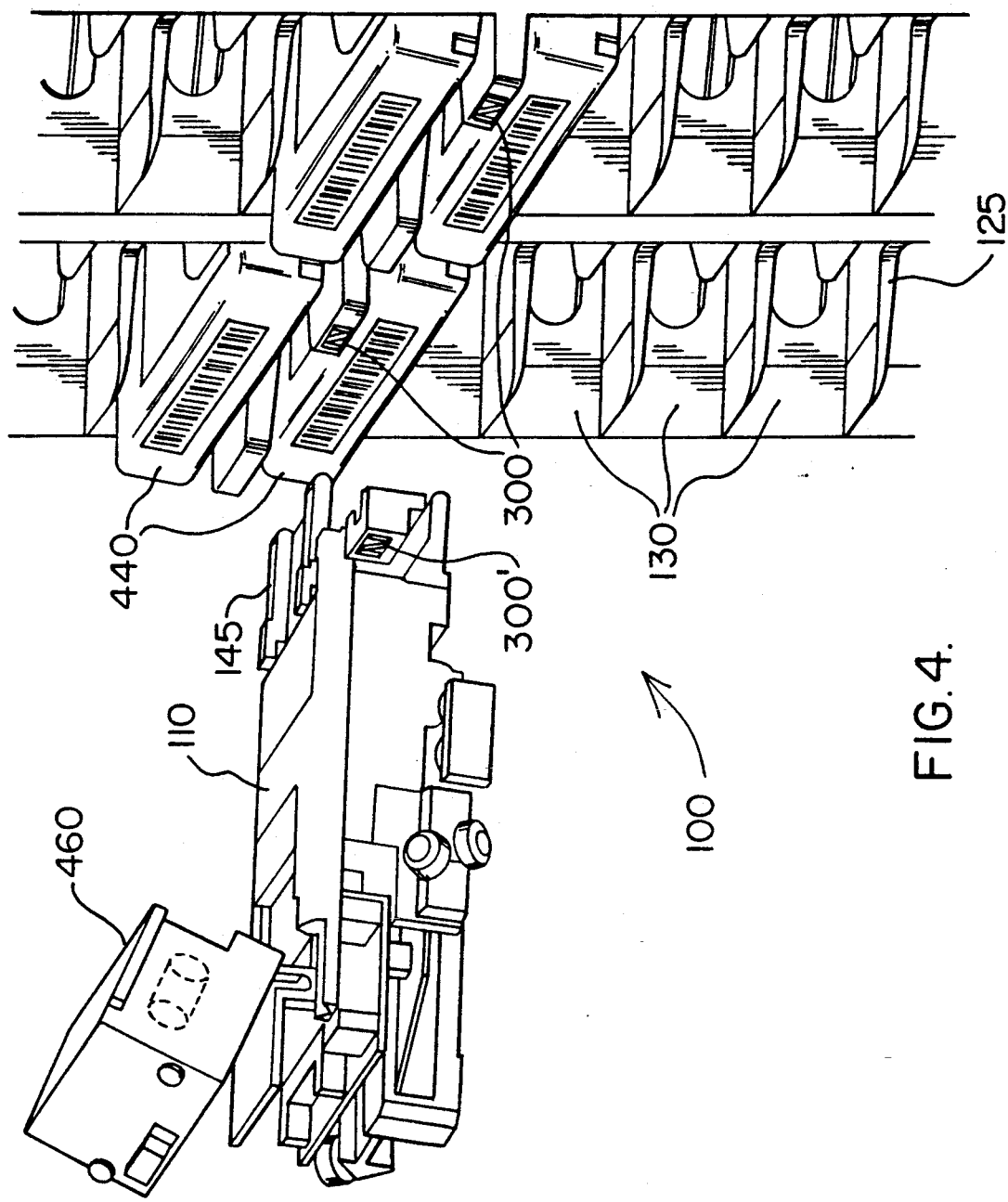
FIG. 4 is a perspective cutaway view of a tape library system 100 showing several of the plurality of locations of the target of the present invention.
Figure 5:
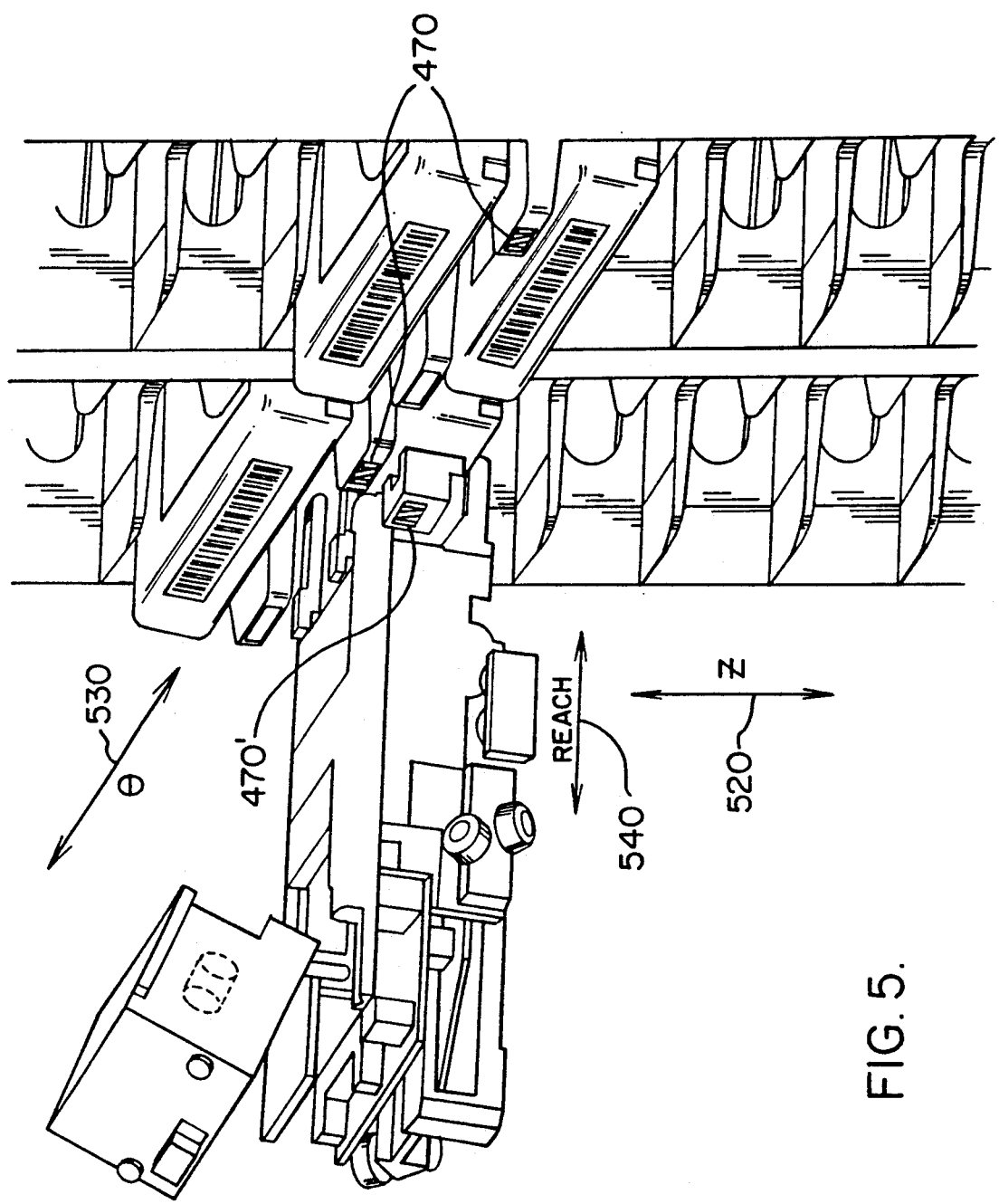
FIG. 5 illustrates the environment shown in FIG. 4 wherein the robotic arm retrieval mechanism is grasping a tape cartridge with the robotic arm target positioned in close proximity to a cartridge cell.

FIG. 4 is a perspective cutaway view of a tape library system 100 showing several of the plurality of locations of the target 300 of the present invention. FIG. 5 illustrates the environment shown in FIG. 4 wherein the robotic arm retrieval mechanism 145 is grasping a tape cartridge 440 with the robotic arm target 300 positioned in close proximity to a cartridge cell.

The present invention operates with one or more "N"-shaped calibration targets 300 which are located on each column 125 of tape cartridge storage cells 130. The position of the robotic arm 110 with respect to the tape cartridge storage cells 130 is determined and adjusted by using a line scan camera vision system 460 to scan these calibration targets 300 located in each of the columns 125. An "N"-shaped target 300' located on the cartridge retrieval mechanism 145 is also used to calibrate the position of the camera 460 with respect to the cartridge retrieval mechanism 145.

As shown in FIG. 5, cartridge retrieval mechanism 145 is capable of movement in a number of directions or axes, at least three of which are calibrated by the present system including:

(1) theta direction 530, in which the robotic arm 110 moves horizontally about the center pivot point of the arm 110 (i.e., the arm 110 moves circularly as viewed from above);

(2) Z direction 520, in which the arm 110 moves vertically; and (3) reach direction 540, in which the arm 110 moves toward or away from a tape cartridge storage cell 130 or target 300.

Position Calibration Target

Figure 3:
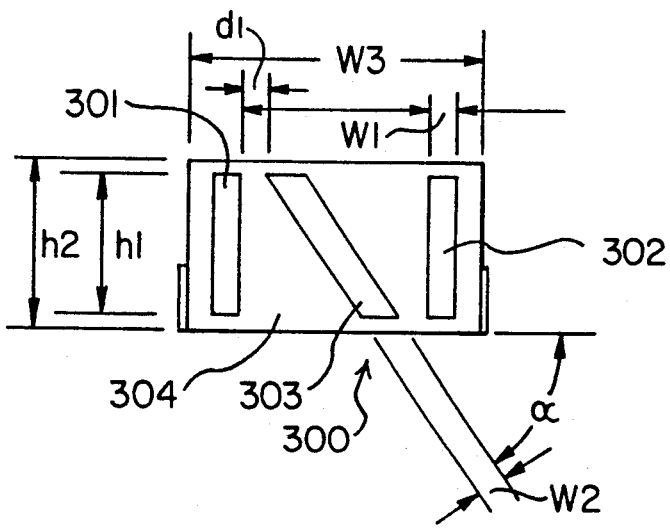
FIG. 3 illustrates one embodiment of the target of the present invention.

FIG. 3 illustrates the position calibration target 300 as seen by the line scan camera vision system 460 of the associated robot arm gripper mechanism. The position calibration target 300 comprises two elements, a background 304 and a plurality of positioning indicia 301-303 imprinted thereon. The positioning indicia 301-303 and the background 304 are selected to be easily distinguishable from each other to enable the line scan camera system to precisely delimit the plurality of positioning indicia 301-303 from the background 304. This is accomplished by the use of contrasting colors whose reflectivity is significantly different. An example of this would be the use of white positioning indicia 301-303 printed on a black background 304. The use of this difference in reflectivity simplifies the task of the line scan camera to delimit the position and boundaries of the plurality of positioning indicia 301-303.

As illustrated in FIG. 3, the plurality of positioning indicia 301-303 comprise a pair of parallel oriented, spaced apart, substantially rectangular bars 301, 302 each of which has a first end and a second end with, for example, the first end being located at the top of FIG. 3 and the bottom end being located at the bottom of FIG. 3 for the purpose of this description. The third positioning indicia comprises diagonal bar 303 which is substantially parallelogram shaped and extends diagonally from the first end of indicia 301 to the second end of indicia 302 such that indicia 303 comprises a diagonal bar that can be used as described below to assist in the position determination process. Each of the parallel indicia 301, 302 is of substantially the same dimensions having a width W1 and a height H1 while the parallelogram shaped bar 303 has a width W2 and a height H1. The selection of exact values for these dimensions is a matter of design choice and is somewhat dictated by the selection of the line scan camera 460 used for the positioning determination. The overall target 300 has a width W3 and a height H2 such that the parallel oriented indicia 301, 302 extend substantially along the full height of target 300 while the diagonal indicia 303 traverses a significant portion of the width W3 of target 300. The parallelogram shaped indicia 303 as illustrated in FIG. 3 does not come in contact with either indicia 301 or 302 but is spaced apart therefrom by a distance D1 in order to provide three distinct indicia for positioning purposes. Optionally, indicia 301 can be joined at either end with indicia 301 and 302 to form a substantially N-shaped pattern on target 300. The parallelogram shaped indicia 303 is angled at an angle alpha from the horizontal as shown in FIG. 3.

It is obvious that the "N"-shaped target 300 depicted in FIG. 3 could be a mirror image of an "N", as well as "Z"-shaped target, and still provide the advantages of the present invention. In the case of a "Z"-shaped target, of course, the scanning thereof would necessarily be in vertical direction, i.e., at direction wherein the scanning was rotated 90 degrees from the scanning of the "N"-shaped target 300.

Location of Calibration Targets

Figures 6, 7:
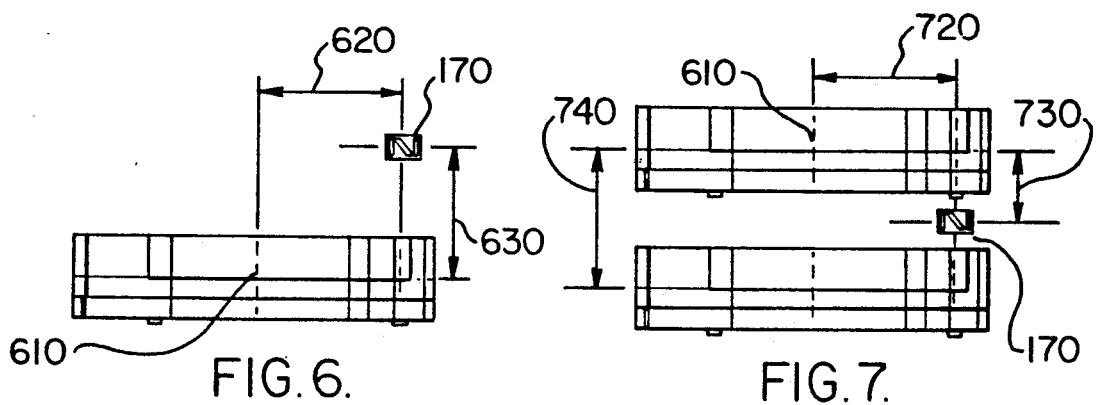
FIGS. 6 and 7 illustrate the relative location of the center point of a cartridge with respect to a magazine target and a column target, respectively.

FIGS. 6 and 7 illustrate the relative location of the center point of a cartridge 440 with respect to a magazine calibration target 300 and a column calibration target 300, respectively.

Certain columns 125 of tape cartridge storage cells 130 may consist of a plurality of removable magazines (not shown), each of which contain a plurality of storage cells 130. Because the magazines are removable, the position of each of these magazines can vary with respect to the initially calibrated position of the robotic arm 110 when a magazine is removed and then reinserted in a column 125. Therefore, each magazine has a calibration target 300 affixed to it, as shown in FIG. 6. Magazine targets 300 are only calibrated on demand, typically when a magazine has been placed into a storage cell column 125. Dimensions 620 and 630 are arbitrary but are constant so that the cartridge cells 130 in a given magazine can be located when the magazine is replaced.

In addition, each storage cell column 125 has a plurality of "column" targets 300 located in each column 125, as shown in FIG. 7. These storage cell targets 300 are calibrated "on-the-fly" during the operation of the library system 100, typically every time a cataloging operation of the library system 100 is performed. Dimensions 720 and 730 are also arbitrary but are also constant. Dimension 740 is the distance between horizontal cartridge centers and allows more than one cartridge 440 to be located from a single target 300.

All the above cartridge cell to target dimensions are relative the center 610 of a given cartridge 440 with respect to the center of an associated target 300.

Initial Calibration Process

The calibration of the robotic arm 110 with respect to the camera 460 is accomplished by the use of an N-shaped calibration target 300 on the robotic arm 110. Calibration of the robotic arm 110 and cartridge retrieval mechanism 145 with respect to the theta, Z, and reach directions (reference nos. 530, 520, and 540) is accomplished by reference to the three N-shaped column targets 300 located in each cartridge cell column 125.

Figure 8:
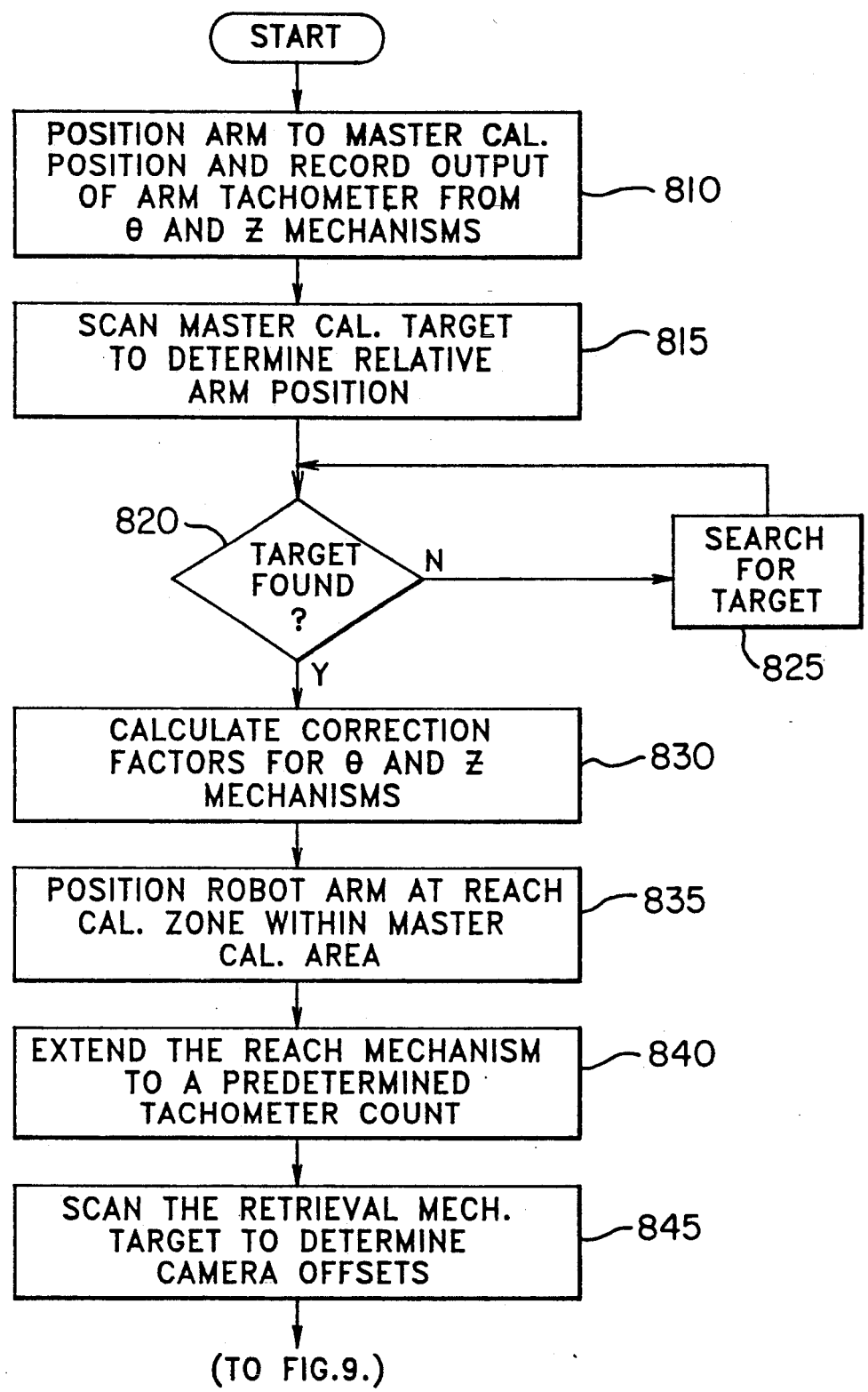
FIGS. 8 and 9 show a flowchart of the initial calibration process.
Figure 9:
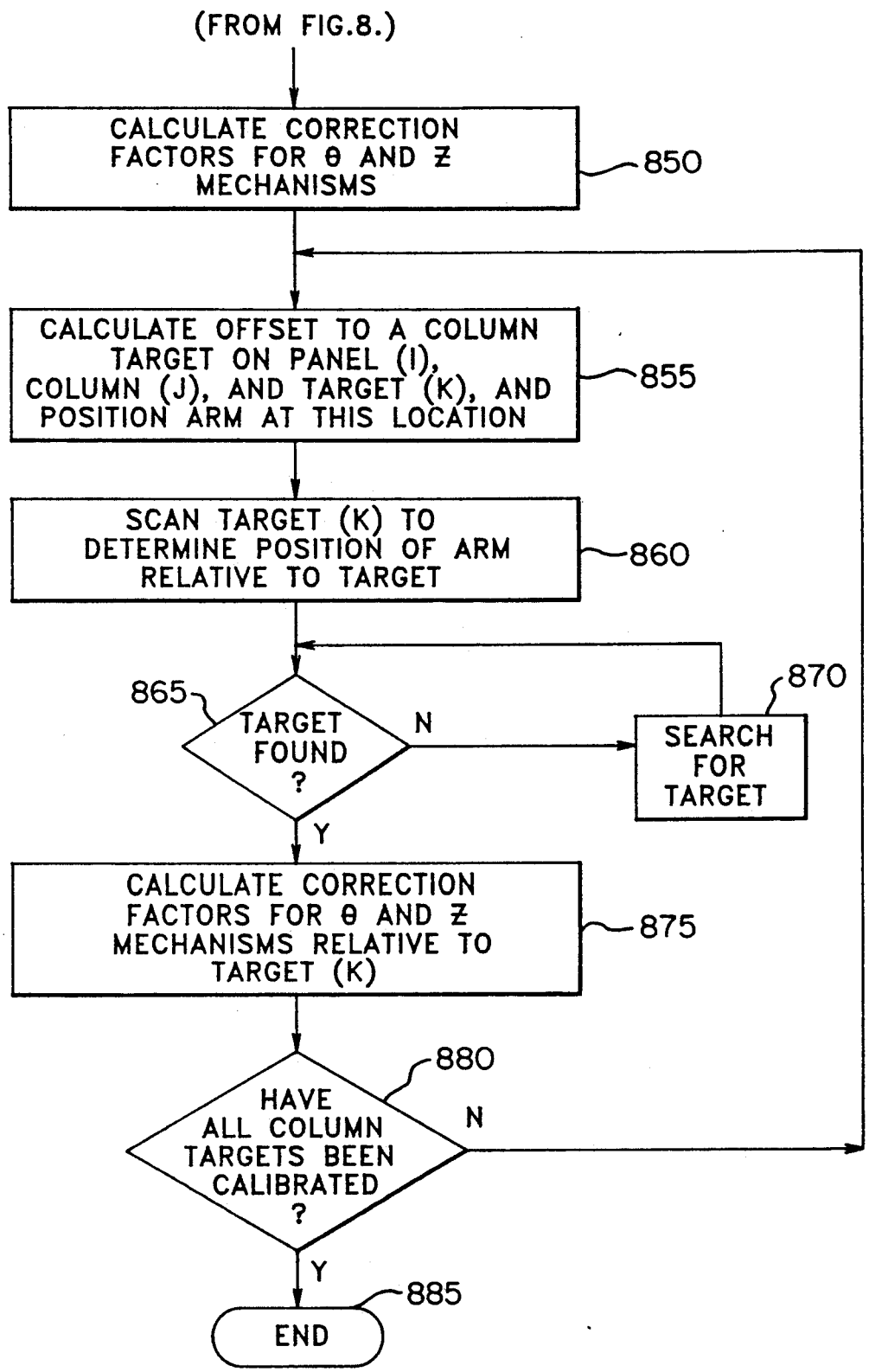

FIG. 8 is a flowchart of the initial calibration process used by the robotic arm controller (not shown). Although only a single scan of the target 300 is required to establish relative positions of robotic arm 110 and a given target 300, three scans are typically processed for a target 300 in a given calibration mode. Even though a single scan provides sufficient data to locate the target 300 in many circumstances, three target scans are taken to ensure that a part of the target 300 has in fact been scanned by the line scan camera 460 on at least one of the scans. Furthermore, by taking more than one scan of the target 300, it is possible to interpolate the exact position of the target 300 relative to a pair of scans. This ability to interpolate is important because of the likelihood that a given segment of the target 300 is not exactly coincident with a scan line.

Even though 25 scans are typically taken of a target 300 in a calibration operation, only three of these scans are processed, thus significantly reducing the time required to process the target image.

More specifically, the initial calibration process comprises the following sequence of operations:
(1) The robotic arm 110 is first positioned to a target 300 in the master calibration area 220 shown in FIG. 2. This initial positioning is based purely on robotic arm tachometer counts. Once this master target 300 has been scanned, all offsets to all other targets 300 within this system 100 are generated.
(2) A calibration is then made of the line scan camera 460 with respect to the retrieval mechanism 145, using the target 300' located on the cartridge retrieval mechanism 145.
(3) Each cartridge cell column 125 in the library system 100 has three "column" targets 300, as shown in FIG. 2. The position of all storage cells 130 within a given column 125 can be calculated from these column targets 300.

The initialization calibration process can be better understood by referring to FIG. 8. At step 810 the controller positions the robotic arm 110 at the master calibration target 300 position. The theta and Z tachometer counts for this position are then recorded. These tachometer counts establish a coarse baseline from which the various cells 130 in the library can be located. At step 815 the line scan camera 460 reads the master calibration target 300 to determine the relative location of the robotic arm 110. If, at step 820, the master calibration target 300 is not found, then at step 825, the arm 110 is repositioned in an attempt to find the master calibration target 300. Steps 820 and 825 are reiterated until master calibration target 300 is found, at which point the controller at step 830 calculates correction offsets for the theta and Z robotic arm mechanisms. At step 835, the robotic arm 110 is positioned in front of the master calibration area 220 where the reach calibration zone is located. At step 840 the controller extends retrieval mechanism 145 to a predetermined tachometer count. The camera 460 then reads the retrieval mechanism target 300' at step 845 to determine the offset between the camera 460 and the retrieval mechanism 145. At step 850 the controller calculates the correction offset for the theta and Z mechanism with respect to camera 460 and retrieval mechanism 145.

At step 855 an iterative process is initiated which involves calculating the offset to a given column target 300 on a specific panel (i), column (j), and target (k). The robotic arm 110 is then positioned to this location. At step 860 the camera 460 reads target (k) to determine the relative position of the arm 110 with respect to this particular target 300. If, at step 865 a target 300 is not found, then the arm 110 is repositioned so as to search for the target 300. If the target 300 was found, then at step 875 the controller calculates the correction offsets for theta and Z mechanisms with respect to the specified target 300 are then calculated. At step 880, a check is made to determine whether all targets 300 have been calibrated. If not, this procedure is repeated beginning with step 855. If all targets 300 have been calibrated, this sequence is terminated at step 885.

Post-Initialization Calibration

Figure 12:
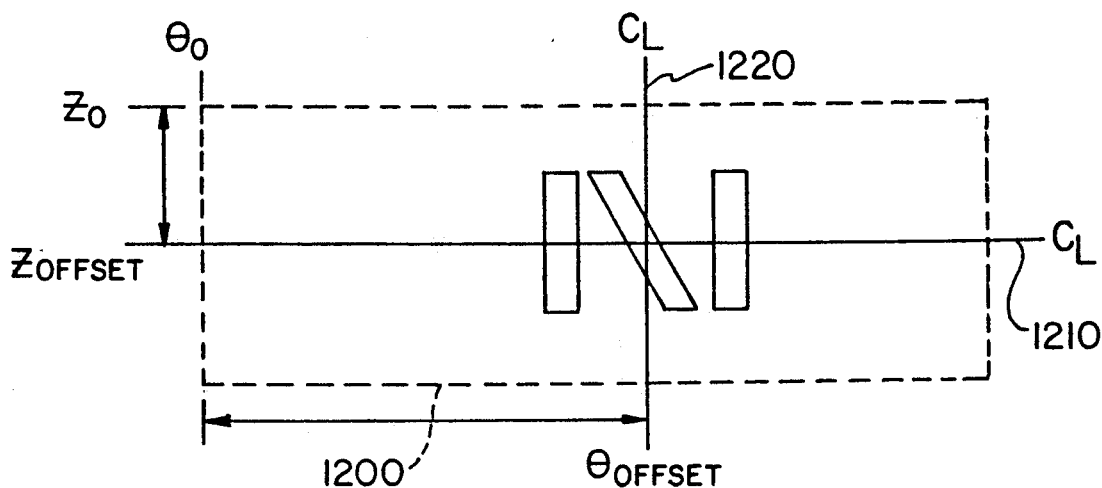
FIG. 12 illustrates a "picture" of the target of the present invention.

As the library system 100 is in operation, "on-the-fly" calibrations are made to ensure that the robotic arm 110 has not "drifted" from the initial calibration values. FIG. 12 illustrates a "picture" 1200 of the target 300 which, in a present embodiment of the invention, is a composite of 25 horizontal scans. Each scan is output to the library system 100 from the video line scan camera 460 as a $1 \times 2048$ pixel "line." The following values are shown in FIG. 12:

$\theta_\phi =$ theta encoder value at start of picture scan; and
$Z_\phi =$ Z direction tachometer value where the first scan of the picture 1200 is taken.

$Z_{offset}$ is the distance between the vertical center 1210 of the target 300 and the top edge of the picture 1200. Theta$_{offset}$ is the distance between the horizontal center 1220 of the target 300 and the left edge of the picture 1200.

Figure 10:
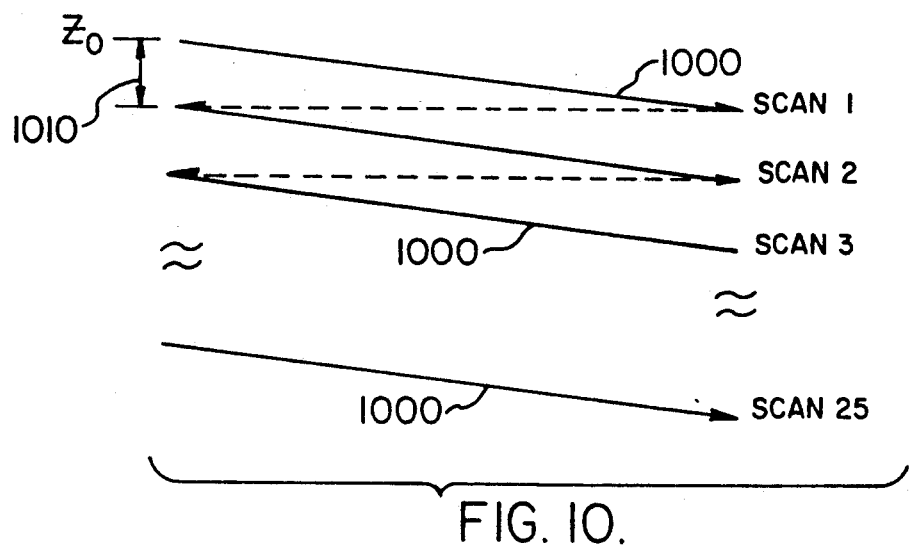
FIG. 10 illustrates the scanning motion of a line scan camera.

FIG. 10 illustrates the scanning motion of line scan 1000 camera 460. Since the camera 460 is moving in the Z-direction 520 (up or down), an actual scan 1000 is not truly vertical, as shown in FIG. 10. Scan line numbers are indicated to the right of each scan line. Scan gap 1010 is the Z distance travelled (between scan 1000s) in thousandths of an inch (mils) from the start of a scan 1000 to the time the scan 1000 is finished. This is a function of the camera scan time. X equals the number of milliseconds (msec) for the camera 460 to write its 2048 pixels of data out to a buffer. If the camera 460 is traveling at y inches/second in the Z direction 520, then the scan gap 1010 can be represented by the following equation:

$$SCAN\ GAP = (x\ msec)\left(y\ \frac{inches}{sec}\right) = Z\ mils \quad (1)$$

Typical values in one embodiment of the present system are X=1 msec and Y=14.5 in./sec, yielding a scan gap value of 14.5 mils. (Note that a conversion of units is required.)

In order to calibrate the robotic arm 110 with respect to the cartridge cells 130 in the library system 100, a determination is made of the center (at coordinates 1210,1220) of the target 300 relative to the center of the picture 1200. A processor (not shown) connected to the camera 460 searches each scan 1000 of the picture 1200 until it finds three valid scans 1000 representing the target 300. From these three scans 1000 it determines (interpolates) where the center (1210,1220) of the target 300 is in the Z and theta directions 520,530.

The horizontal location of the target 300 is determined by finding the center of the width of the target 300. The vertical location of the target 300 is determined by first measuring the width of the target 300 which is visible to the left of the diagonal stripe and the width of the target 300 which is visible to the right of the diagonal stripe. The ratio of the left portion to the right portion provides an accurate indication of how far a given scan line is from the horizontal center 1100 of the target 300. This indication is accurate without regard to the distance between the target 300 and the camera 460.

The $Z_{offset}$ and $Theta_{offset}$ values are then calculated as follows:

$Z_{offset}$ = interpolated scan line number * SCAN-GAP
$\theta_{offset}$ = number of pixels in to the center of the target as interpolated * (z mils/pixel)

In one embodiment of the present invention, the distance between pixels can be calculated as follows:

$$\frac{2048\ pixels}{Camera\ Field\ of\ View} = \frac{2048\ pixels}{5.0\ in.} = \frac{409.6\ pixels}{in.}$$

or 2.44 mils/pixel.
Therefore, the center of target coordinates =

$(Z_\phi + Z_{offset}, \theta_\phi + \theta_{offset})$.

This target coordinate value is then compared to the value previously found in the stationary calibrations. If the present value is not equal to the previous value, robotic arm 110 will perform a stationary calibration on that target 300.

The system of the present invention is also independent of the spacing between the camera 460 and the target 300. This is because the formulas used to calculate the center (1210,1220) of the target 300 employ a ratio technique which eliminates variables caused variations in camera to target 300 spacing.

Figure 11:
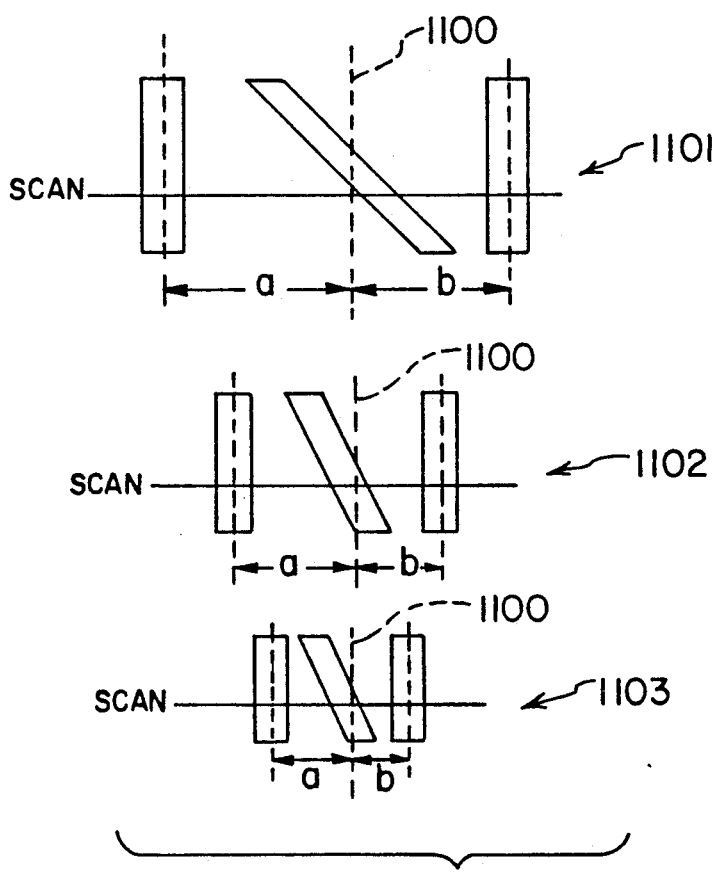
FIG. 11 illustrates the target of the present invention as scanned from three different distances.

FIG. 11 illustrates a target 300 as scanned from three different distances. Reference number 1101 shows a scan 1000 taken at a relatively close distance, Reference number 1102 shows a scan 1000 taken at an intermediate distance, and Reference number 1103 shows a scan 1000 taken at a relatively further distance than numbers 1101 and 1102. Although only a single line scan 1000 of the target 300 is made in each case, the entire target 300 is shown for the purpose of explanation.

It is obvious that the ratio b/a or a/b will be the same in all cases shown in FIG. 11. Therefore, variations in camera to target 300 distance does not affect the calibration of the robotic arm 110.

In addition, the sum (a+b) can be used to calibrate the arm 110 to wall (arm reach calibration). variation. A value for correct camera to target 300 distance called Reach-Nominal ($R_n$) is stored in library system 100 memory. Reach offset (the camera to target 300 distance) is then calculated by the formula:

$$R_{offset} = R_n - (a+b)$$

A negative value of $R_{offset}$ means that the camera to target 300 distance is smaller than it should be and a positive value means that the distance is greater than it should be.

It should be noted that the present invention is operable with any number of other types of storage systems in addition to those systems used to store magnetic tape or other media cartridges 440.

It is to be expressly understood that the claimed invention is not to be limited to the description of the preferred embodiment but encompasses other modifications and alterations within the scope and spirit of the inventive concept.

We claim:

1. In a storage system for storing a plurality of objects in an array of object storage locations and having a robotic arm with a line scan camera attached thereto, a method for calibrating a position of said robotic arm with respect to a given one of said objects stored in said system to enable said robotic arm to retrieve said given one of said objects, said method comprising the steps of:
    (a) displaying on said array of object storage locations in a predetermined position thereon an "N"-shaped target having a first stripe, a second stripe parallel to said first stripe, and a middle stripe positioned diagonally between said first stripe and said second stripe, said first, middle and second stripes being aligned in a horizontal direction;
    (b) scanning said target with a single scan of said line scan camera in a direction from said first stripe to said second stripe to produce a scanned image of said target; and
    (c) determining a vertical position of said robotic arm with respect to said given one of said objects by analyzing said scanned image.

2. The method of claim 1, further comprising the step of:
    determining said horizontal position of said robotic arm with respect to said given one of said objects by analyzing said scanned image.

3. The method of claim 2, wherein said step of determining a horizontal position of said robotic arm further includes the following steps:
    (a) determining the location of a theta center of said N-shaped target by calculating a distance between the centers of said first stripe and second stripe in a horizontal direction and dividing said distance by 2;

(b) determining a theta offset between a center of said target in said horizontal direction and the center of said scanned image of said target in said horizontal direction by computing the difference between said theta center and the middle of said scanned image in said horizontal direction; and (c) using said theta offset to calibrate a position of said robotic arm with respect to said given one of said objects.

4. In a storage system for storing a plurality of objects in an array of object storage locations and having a robotic arm with a line scan camera attached thereto, apparatus for calibrating a position of said robotic arm with respect to a given one of said objects stored in said system to enable said robotic arm to retrieve said given one of said objects, said apparatus comprising:

means for displaying on said array of object storage locations in a predetermined position thereon an "N"-shaped target having a first stripe, a second stripe parallel to said first stripe, and a middle stripe positioned diagonally between said first stripe and said second stripe, said first, middle and second stripes being aligned in a horizontal direction;

means for scanning said target with a single scan of said line scan camera in a direction form said first stripe to said second stripe to produce a scanned image of said target; and means for determining a vertical position of said robotic arm with respect to said given one of said objects by analyzing said scanned image.

5. The apparatus of claim 4, further comprising:

means for determining a horizontal position of said robotic arm with respect to said given one of said objects by analyzing said scanned image.

6. The apparatus of claim 5, wherein said horizontal position determining means further comprises:

means for determining the location of a theta center of said target by calculating the distance between the centers of said first stripe and second stripe in a horizontal direction and dividing said distance by 2;

means for determining a theta offset between the center of said target in said horizontal direction and the center of said scanned image of said target in said horizontal direction by computing the difference between said theta center and the middle of said scanned image; and means for using said theta offset to calibrate a position of said robotic arm with respect to said given one of said objects.

7. In a storage system for storing a plurality of objects in an array of object storage locations having affixed in a predetermined position thereon an"N"-shaped target having a first stripe, a second stripe parallel to said first stripe, and a middle stripe positioned diagonally between said first stripe and said second stripe, said first, middle and second stripes being aligned in a horizontal direction, said system having a robotic arm with a line scan camera attached thereto, a method for calibrating a position of said robotic arm with respect to a given one of said objects stored in said system to enable said robotic arm to retrieve said given one of said objects, said method comprising the steps of:

(a) scanning said target with a single scan of said line scan camera in a direction from said first stripe to said second stripe to produce a scanned image of said target; and (b) determining a vertical position of said robotic arm with respect to said given one of said objects by analyzing said scanned image.

8. The method of claim 7, further comprising the step of:

determining a horizontal position of said robotic arm with respect to said given one of said objects by analyzing said scanned image.

9. The method of claim 8, wherein said step of determining a horizontal position of said robotic arm further includes the following steps:

(a) determining the location of a theta center of said target by calculating the distance between the centers of said first stripe and second stripe in a horizontal direction and dividing said distance by 2;

(b) determining a theta offset between a center of said target in said horizontal direction and the center of said scanned image of said target in said horizontal direction by computing the difference between said theta center and the middle of said scanned image; and (c) using said theta offset to calibrate a position of said robotic arm with respect to said given one of said objects.

10. In a storage system for storing a plurality of objects in an array of object storage locations having affixed in a predetermined position thereon an"N"-shaped target having a first stripe, a second stripe parallel to said first stripe, and a middle stripe positioned diagonally between said first stripe and said second stripe, said first, middle and second stripes being aligned in a horizontal direction, said system having a robotic arm with a line scan camera attached thereto, apparatus for calibrating a position of said robotic arm with respect to a given one of said objects stored in said system to enable said robotic arm to retrieve said given one of said objects, said apparatus comprising:

means for scanning said target with a single scan of said line scan camera in a direction from said first stripe to said second stripe to produce a scanned image of said target; and means for determining a vertical position of said robotic arm with respect to said given one of said objects by analyzing said scanned image.

11. The method of claim 10, further comprising:

means for determining a horizontal position of said robotic arm with respect to said given one of said objects by analyzing said scanned image.

12. The apparatus of claim 11, wherein said horizontal position determining means further comprises:

means for determining the location of a theta center of said target by calculating the distance between the centers of said first stripe and second stripe in a horizontal direction and dividing said distance by 2;

means for determining a theta offset between the center of said target in said horizontal direction and the center of said scanned image of said target in said horizontal direction by computing the difference between said theta center and the middle of said scanned image; and means for using said theta offset to calibrate a position of said robotic arm with respect to said given one of said objects.

* * * * *